FM MULTIPLEX STEREO RADIO SIGNAL RECEIVERS

Filed Feb. 16, 1962 3 Sheets-Sheet 1

INVENTOR.
JOHN O. SCHROEDER
BY Eugene M. Whitacre
ATTORNEY

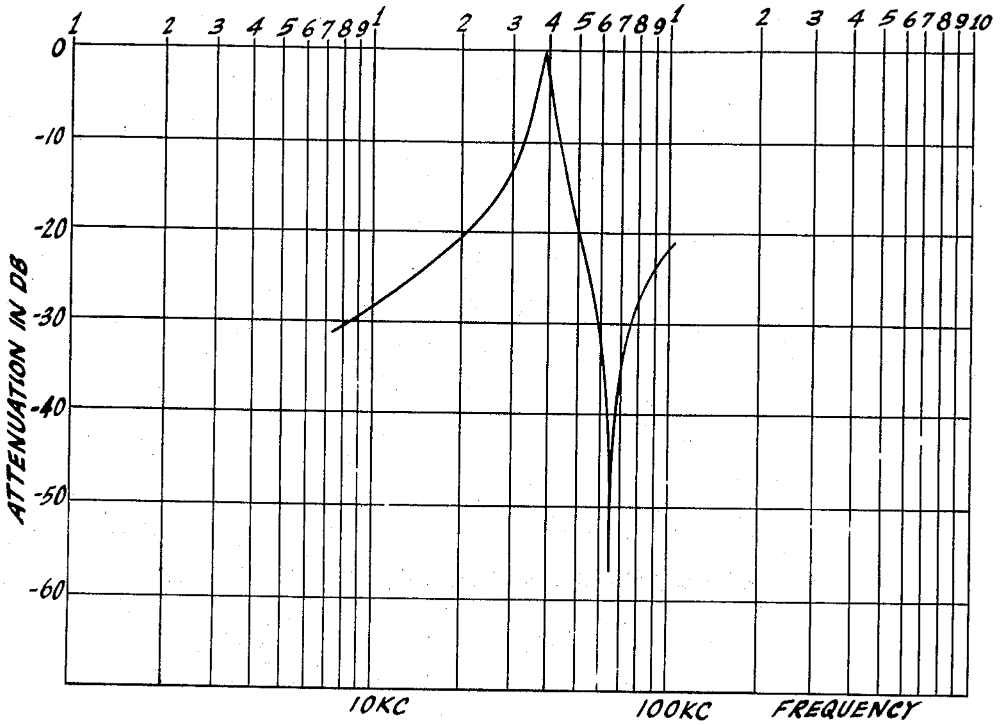
FIG. 3.
FIG. 4a.
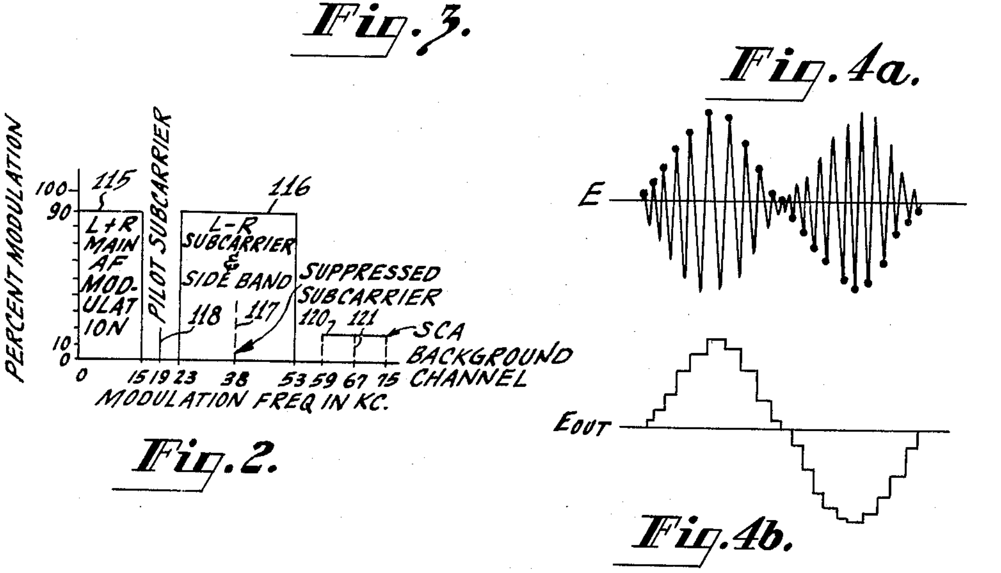
FIG. 2. FIG. 4b.
INVENTOR.
JOHN O. SCHROEDER
BY Eugene M. Whitacre
ATTORNEY INVENTOR.
JOHN O. SCHROEDER
BY Eugene M. Whitacre
ATTORNEY United States Patent Office 3,249,697 Patented May 3, 1966

3,249,697

FM MULTIPLEX STEREO RADIO SIGNAL RECEIVERS

John O. Schroeder, Hamilton Square, N.J., assignor to Radio Corporation of America, a corporation of Delaware Filed Feb. 16, 1962, Ser. No. 173,785
14 Claims. (Cl. 179—15)

The present invention relates to stereophonic multiplex radio signal receivers, and more particularly to compatible stereophonic multiplex frequency-modulation radio receivers which operate in response to both monophonic and stereophonic signal information on a single modulated carrier wave.

In such receivers, under the presently accepted method of broadcasting, the carrier wave is frequency-modulated by the sum of two modulating audio frequency signals, such as two stereophonically-related left and right or (L) and (R) signals, as a single modulating signal in the usual manner for FM broadcast and compatible reception by existing monophonic receivers. However, in the multiplex system, the carrier wave further is simultaneously provided with stereophonic information effective for signal separation, in the form of a suppressed carrier subcarrier signal which is amplitude-modulated with the difference of the two stereophonically related signals to be transmitted, and a pilot signal for use in demodulating the suppressed carrier signal.

The compatible composite stereophonic signal at the multiplex output circuit or terminal of the frequency-modulation detector of the multiplex receiver may thus be composed of the main frequency-modulation signal component, which is the compatible signal used by an unmodified or monophonic frequency-modulation receiver, a 19 kc. (kilocycles per second) pilot signal, and the difference-frequency, (L—R) signal that is an AM double-sideband suppressed-carrier signal at 38 kc., the second harmonic of the pilot subcarrier. The sum and difference matrixing in conjunction with the AM suppressed-carrier subchannel permits a maximum of 90% modulation of the main carrier either by the sum (L+R) modulation audio frequency signal itself, or the difference (L—R) modulation-signal suppressed-carrier subchannel signal. The phase and frequency response of both the "sum" and "difference" signal channels are substantially the same over an audio-frequency range of 50–15,000 cycles (cycles per second) for example, and channel separation of 30 db can be attained.

In addition it is contemplated, in accordance with the present method of broadcasting, to provide SCA (Subsidiary Communications Authorization) background music or program material in a second subcarrier signal channel, that may be on a subcarrier frequency of 67 kc. and that can modulate the main carrier up to 10% with sidebands of approximately 8 kc. on each side, in an upper band between 59 kc. and 75 kc.

There are many existing frequency-modulation receivers in use that can be or are arranged for adaptation to stereophonic signal translation and reproduction by the provision of multiplex signal output connection means at the frequency-modulation detector and preceding the de-emphasis circuit. A stereophonic multiplex unit for separating and deriving the two stereophonically-related signals from a compatible stereophonic signal is thus desirable and can be made integral with, and part of, new receivers or applied as an adaptor unit to existing receivers.

In existing systems, the compatible composite stereophonic signal at the multiplex output circuit or terminal of the frequency-modulation detector, as hereinbefore referred to, is applied to the stereophonic multiplex unit which operates to separate the subcarrier or stereophonic information with a suitable highpass or bandpass filter means after which the difference (L—R) component is demodulated. By suitable matrix circuitry which follows, the demodulated subcarrier signal (L—R) is subtracted from and added to the sum signal (L+R) component to obtain separate stereophonically-related or L and R signals which are then fed to two separate stereophonic signal output channels.

When a frequency modulation station to which the receiver is tuned is not transmitting a pilot signal (19 kc.) and broadcasts monophonic or single channel program material, it is desirable to disable the subcarrier of (L—R) stereo channel in the receiver. This feature is particularly important for stations which transmit SCA subcarriers with sideband frequencies falling in the range of 23–53 kc. Such subcarrier sidebands are applied to the subcarrier detector and may appear as crosstalk in the signal output of the stereo multiplex unit. The reason is that, in the absence of a pilot signal, the highpass or bandpass filter in the subcarrier channel provides a path for any signals of subcarrier frequency to come through to the subcarrier detector. Ignition noise, impulse noise, and thermal noise signals, also may pass through the bandpass filter for the subcarrier sidebands. If the subcarrier detector is of the type that includes a locked oscillator which is not de-energized during monophonic reception, these spurious signals will then be detected by the subcarrier detector and will pass through the matrix circuitry and appear at the stereophonic channel output circuits along with the main channel signals. In the case of subcarrier detectors which do not include locked oscillators, noise at 19 kc. may produce periodic ringing of the tuned circuits to produce spurious detection and objectionable noise in the audio frequency range in the subcarrier detector output circuit.

In addition to the foregoing, it has been found desirable for commercial reasons to provide some means to indicate when a stereophonic signal is being received. Heretofore it has been suggested that a lamp be provided which is energized by a separate tube or relay that is in turn actuated when the 19 kc. pilot signal is present.

It is accordingly an object of this invention to provide an improved stereophonic multiplex unit for FM receiver.

A further object of this invention is to provide an improved stereophonic multiplex unit for FM radio receivers which improves the signal to noise ratio thereof in operation and which provides monophonic operation automatically in the absence of a pilot or subcarrier signal.

A still further object of this invention is to provide an improved stereophonic multiplex adaptor unit for use with an FM radio detector at the multiplex output terminal thereof which will automatically disable the stereophonic information translation channel in the absence of a pilot signal, and thereby cut off undesired noise output from the channel to permit automatic monophonic or stereophonic operation depending upon the type of signal that is being received.

Another object of this invention is to provide a simple and effective indicator for stereophonic FM receivers for indicating whether a stereophonic signal is being received.

In accordance with the invention, citing frequencies by way of example, an FM stereophonic multiplex unit is provided with a subcarrier detector which is connected to receive the subcarrier sidebands and a 38 kc. wave from an oscillator stage. The oscillator is biased in a manner to be inoperative in the absence of a received 19 kc. pilot signal. When a pilot signal is received, it is separated from the remainder of the FM signal, and applied to a rectifier which is connected to develop a D.-C. voltage for use in turning on the oscillator. In one embodiment of the invention, the rectifier is a full wave ractifier so that a 38 kc. ripple component is produced from rectification of the pilot signal to synchronize the oscillator. Since the 38 kc. oscillator signal is required for detection of signals fed to the subcarrier detector, the subcarrier channel is inoperative when the oscillator is cut-off. Accordingly, since oscillations occur only during the reception of stereophonic signals containing the 19 kc. pilot signal, the subcarrier channel is effectively cut-off entirely automatically when monophonic broadcasts are received. Thus the receiver may respond automatically to monophonic signals when the pilot signal is absent and only the monophonic L+R signal is applied to the output circuit.

In accordance with a feature of the invention, an indicator circuit is provided to indicate when stereophonic signals are being received, by the connection of a lamp, such as a neon lamp in the oscillator circuit. The lamp is energized by the oscillator signal which operates only during stereophonic reception.

A still further feature of the invention is the provision of a balanced full wave rectifier circuit for doubling the 19 kc. pilot signal. The balanced circuit is connected so that substantially none of the 19 kc. component is applied to the oscillator tube, and hence the danger of applying a 19 kc. component to the subcarrier detector through the oscillator circuit is reduced. As will be explained hereinafter, the 19 kc. components applied to the subcarrier detector interact with detected signals whose frequencies are subharmonics of 19 kc. to produce objectionable intermodulation distortion products.

The novel features which are considered to be characteristic of this invention are set forth with particularity in the appended claims. The invention, itself, however both as to its organization and method of operation as well as additional objects of advantages thereof will best be understood from the following description when read in connection with the accompanying drawings in which:

FIGURE 2 is a graph indicating the range of frequency spectrum and modulation components of a composite modulation signal as applied to the stereophonic multiplex unit of the other circuit of FIGURE 1, with reference to certain operating features of the invention;

FIGURE 3 is a graph showing the frequency response characteristics of subcarrier sideband separating filter and de-emphasis network used in the stereophonic multiplex unit of FIGURE 1;

Figure 1:
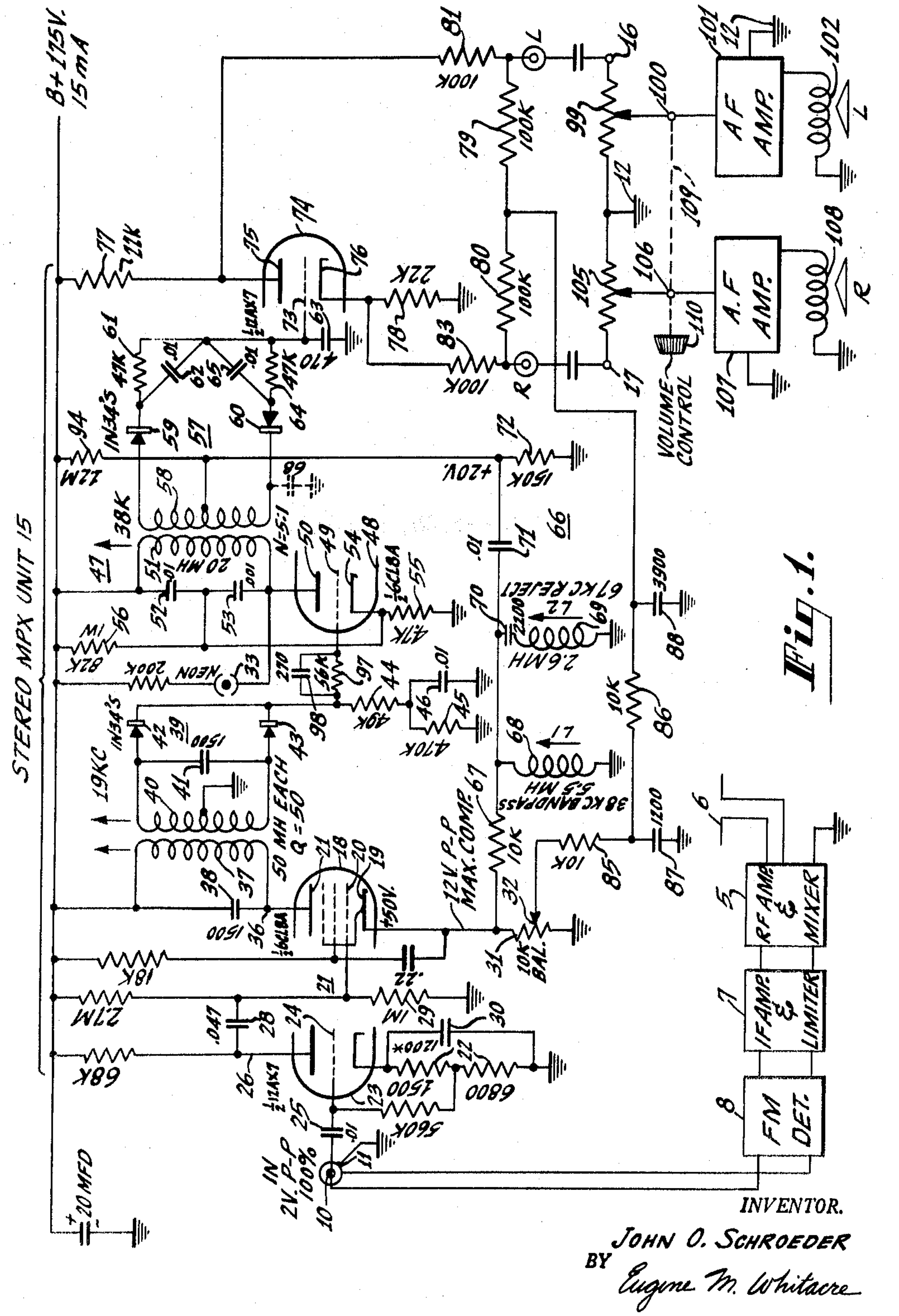
FIGURE 1 is a schematic circuit diagram of a multiplex demodulator and matrixing unit embodying the invention, shown in connection with an FM receiver and an audio amplifier in block form.
Figures 5, 6, 7:
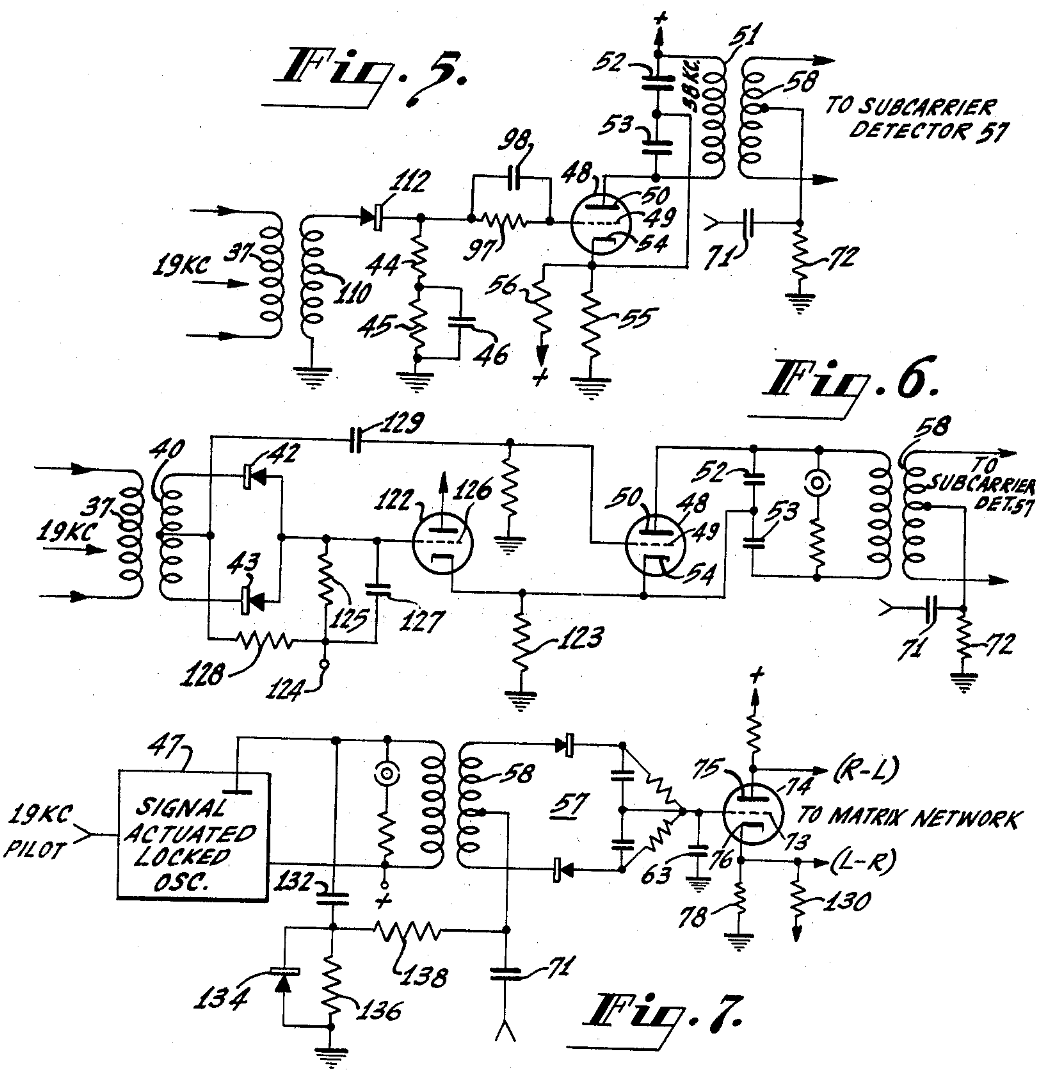
Figure 8:
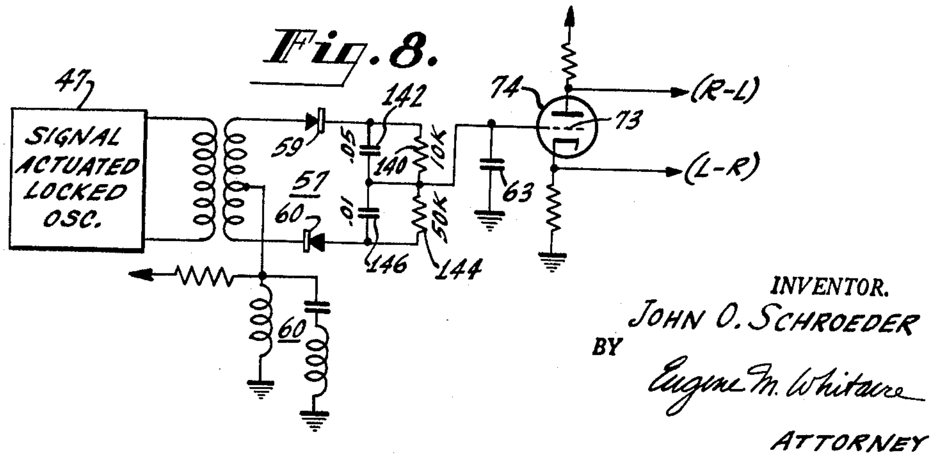

FIGURES 4*a* and 4*b* are graphs respectively, showing the stereophonic sideband information for a cycle of a modulating signal, and the demodulated wave resulting therefrom after detection in the subcarrier detector of FIGURE 1;

FIGURE 5 is a schematic circuit diagram of another form of subcarrier detector which may be used in the multiplex demodulated and matrixing unit of FIGURE 1 to provide automatic stereophonic-monophonic operation;

FIGURE 6 is a schematic circuit diagram of a still another circuit for deriving a phase and frequency controlled switching signal for use in stereophonic multiplex detector circuits embodying the invention;

FIGURE 7 is a schematic circuit diagram of a portion of a multiplex demodulator unit embodying a feature of the invention wherein an amplifier stage following the subcarrier detector is rendered inoperative except during stereophonic reception; and FIGURE 8 is a schematic circuit diagram showing a modification of the circuit of FIGURE 7.

Referring to the drawings and more particularly to FIGURE 1, the part of the receiver circuit shown in block form is representative of certain components of any frequency modulation receiver which may be adapted for stereophonic multiplex operation. In this respect it is provided with the usual R.-F. amplifier and mixer 5 tunable through the frequency-modulation band of 88 to 108 mc., and coupled to antenna means 6 and the usual I.-F. amplifier and limiter 7 which is followed by a suitable FM detector 8. The FM detector 8 includes a pair of output terminals 10 and 11 across which are developed the main channel or (L+R) signals, the subcarrier sidebands representative of the (L—R) signal and the 19 kc. pilot tone.

Connected with the multiplex output circuit or terminals 10–11 of the FM detector 8 is a stereophonic multiplex unit 15 for deriving two stereophonically-related (L and R) or like modulation signals from the composite signal at the FM detector output terminals. This unit may be added to existing receivers or may be built integrally therewith during manufacture, and provides, at two stereo or channel output terminals 16 and 17, the separated modulation component signals such as the L and R stereo signals in the present example.

In the stereo multiplex unit 15, a signal amplifier stage is provided in connection with an amplifier tube 18 having a cathode 19, a control grid 20 and an output anode 21. In the present example this may be the pentode portion of a pentode-triode tube for economy of construction. This stage may be coupled directly with the FM detector 8 output terminals 10–11, but in the present example is preferably coupled therewith through an intermediate signal amplifier stage comprising a triode amplifier tube 23 which may be the other half of the pentode-triode. The triode tube 23 has an input grid circuit 24 coupled to the terminal 10 through a coupling capacitor 25, and a cathode circuit including a resistor network 22 which is partially bypassed by a capacitor 30 to boost the high frequency response of the stage. An output plate circuit 26 for the tube 23 is coupled to the input grid 20 of the tube 18 through a grid circuit 27 including a coupling capacitor 28 and a grid resistor 29 connected between the grid 20 and ground. The cathode circuit of the tube 18 includes a resistor 31 having a movable tap 32. The plate or anode circuit 36 of the amplifier tube 18 is tuned to the pilot signal, which is 19 kc. in the present example, by a tunable winding 37 and shunt tuning capacitor 38.

Frequency doubling of the 19 kc. pilot signal is accomplished by a full wave rectifier circuit 39. The full wave rectifier 39 includes a grounded center tapped winding 40 which is coupled to the winding 37, and is tuned to the pilot signal frequency by a capacitor 41. In addition, the full wave rectifier frequency doubler includes a pair of diodes, which are shown as semiconductor diodes, 42 and 43, the cathodes of which are connected together and the anodes of which are connected respectively to opposite ends of the winding 40. The direct current paths for the diodes 42 and 43 is completed through a pair of series connected resistors 44 and 45 to ground and the center tap of the winding 40. A capacitor 46 is connected in parallel with the resistor 45.

A modified Colpitts oscillator circuit 47 which is inoperative in the absence of the pilot signal includes a triode tube 48 which may comprise a portion of a dual-triode tube. The tube 48 includes a control grid 49 which is coupled through a parallel resistor 97, capacitor 98 network to the junction between the diodes 42 and 43 and the resistor 44 to receive a turn-on voltage and a phase locking signal when a 19 kc. pilot signal is received. The anode 50 of the triode 48 is connected to a source of energizing potential +B, through a parallel resonant tank circuit tuned to 38 kc., which is twice the frequency of the pilot signal. The parallel resonant circuit includes a tunable inductor 51 across which a pair of series capacitors 52 and 53 is connected. The junction of the capacitors 52 and 53 is connected to the cathode 54 to sustain oscillation when the tube 48 is properly biased. During monophonic reception, the tube 48 is cut-off because the cathode 54 is connected to the junction of a pair of resistors 55 and 56, which are serially connected between the operating potential supply terminal +B and ground to receive a cut off bias. When the pilot signal is received, the direct voltage appearing across the resistors 44 and 45 permits the oscillator circuit to commence oscillation locked in frequency and phase to the 38 kc. ripple component produced by the full wave rectification of the pilot signal. Although the oscillator shown in FIGURE 1 is connected to operate with its grid bias at reference potential, the oscillator configurations can be used without departing from the scope of the invention.

A stereophonic reception indicator circuit comprising a neon tube 33, and a resistor 34 is connected between the oscillator tube anode and the +B terminal. The neon tube lights up only when the circuit 47 is oscillating, that is, only during stereophonic signal reception.

A switching voltage at 38 kc. from the oscillator circuit 47 is coupled to a balanced synchronous peak detector circuit 57 which is operative to derive the (L−R) signal components from the subcarrier signal sidebands. The detector circuit 57 includes a center tapped winding 58 which is coupled to the oscillator tank circuit inductor 51, and a pair of diodes 59 and 60. The anode of the diode 59 is connected to one end of the winding 58, and the cathode thereof is coupled through a parallel resistor 61, capacitor 62 network to ground by way of a capacitor 63. The cathode of the diode 60 is connected to the opposite end of the winding 58, and the anode thereof is coupled through a parallel resistor 64, capacitor 65 network to the capacitor 63 and hence to ground.

The subcarrier sidebands containing the (L−R) signal information are inserted into the detector circuit 57 at the center tap of the winding 58. To this end it should be noted that the composite demodulated FM signal including the (L+R) 19 kc. pilot signal and the subcarrier wave sidebands appear at the cathode 19 terminal of the amplifier 18. To select the subcarrier wave sidebands a combined filter and de-emphasis network 66 couples the cathode 19 to the center tap of the winding 58. The filter and de-emphasis includes a series resistor 67, a shunt inductor 68, and a trap circuit comprising an inductor 69 and capacitor 70 which are series resonant at 67 kc. the frequency of an (SCA) channel which may also be transmitted on the same carrier. The inductor 68 resonates with the effective capacitance thereacross at a frequency of 38 kc., the center frequency of the subcarrier channel, and attenuates signals on either side of 38 kc. The overall characteristic of the network is such that the high frequencies of the resultant demodulated signals are attenuated at approximately a rate of 75 microseconds to provide high frequency de-emphasis. As is known, such de-emphasis is necessary to compensate for the high frequency pre-emphasis added at the transmitter to improve the overall signal to noise ratio of the FM transmission and receiving system.

A blocking capacitor 71 couples the signal output from the filter 66 to a resistor 72 connected between the center tap of the winding 58 to ground, and a resistor 94 extending from the center tap to +B establishes the bias level for a phase splitter tube 74.

Demodulated subcarrier sideband signals (L−R) are developed across the capacitor 63 and applied to the control grid 73 of a triode tube 74 which is connected as a phase splitter. The tube 74 includes an anode 75 and cathode 76 which are connected respectively, through load impedance elements 77, 78 to the operating potential supply source +B, and to ground.

A matrix network including a pair of series connected resistors 79 and 80 are coupled to receive opposite phases of the (L−R) signal from the phase splitter stage 74. One end of the resistor 79 is coupled to the anode 75 through an isolating resistor 81 to receive the +(L−R) signal, and one end of the resistor 80 is coupled to the cathode 76 through an isolating resistor 83 to receive the −(L−R) signal.

The (L+R) signal, derived from the cathode 19 of the amplifier 18, is applied between the junction of the resistors 79 and 80 and ground. The pilot signal and subcarrier sidebands as well as other high frequency components which may be present at the cathode 19 are effectively removed by the high frequency de-emphasis circuit comprising the series resistors 85 and 86 and the shunt capacitors 87 and 88. The time constant of this de-emphasis network, taking into account the loading of the resistors 79 and 80 is approximately 75 microseconds. The (L+R) signal adds to the +(L−R) and −(L−R) signals respectively, to produce the left and right stereophonic signals at the terminals 16 and 17 respectively. Adjustment of the tap 32 on the variable resistor 31 provides the proper amount of (L+R) signal to the matrix circuit so that the addition and subtraction of the (L+R) and (L−R) signals produces the proper signal output at the terminals 16 and 17.

The radio receiver signal translating system includes suitable means connected with the terminals 16 and 17 of the stereo multiplex unit to amplify and reproduce the two channel signals, which are here assumed to be the left and right, or L and R, audio-frequency signals which are stereophonically-related. To this end, the terminal 16 is connected to system ground 12 through an output volume-control potentiometer resistor 99 having an output volume control contact 100 connected with a suitable audio frequency channel amplifier 101, as indicated, which has a common ground return connection 12 and is connected to drive a left-channel output loudspeaker 102.

Likewise the output terminal 17 is connected to system ground 12 through a second channel volume-control potentiometer resistor 105 having an output volume control contact 106 connected to the second channel amplifier means 107, having a common ground return connection 12 and a right channel output loudspeaker 108 connected therewith as shown. As is customary, the volume-control means are gang-connected for joint operation as indicated by the dotted line connection 109 and the common volume control knob represented at 110 in connection therewith. This dual-channel signal translating circuit and sound-reproducing output means therefor is representative of any suitable means of this type normally provided in a stereophonic sound reproducing system.

Referring now to FIGURE 2 along with FIGURE 1, the operation of the multiplex unit in the receiver may now be considered. The composite signal at the multiplex output terminals 10–11 of the FM detector 8 when the receiver is responding to compatible stereophonic signals, may be represented by the graph of FIGURE 2 drawn with reference to the FM carrier modulation frequency in kilocycles along the X axis and percentage modulation along the Y axis which also indicates relative amplitudes of subcarrier signals. It will be seen that the total signal is composed of an (L+R) component 115 which may provide as much as 90% modulation and an (L−R) double-sideband suppressed-carrier AM signal component 116 which may also modulate the carrier up to 90% as indicated, but 180° out of phase with the modulation provided by the main modulation component 115. In other words when the component 115 is maximum the component 116 is minimum.

In the graph of FIGURE 2, it is assumed that the audio-frequency modulation will extend from zero to 15 kc. As a practical matter it is known that the modulation frequency actually may extend between 50 cycles and slightly less than 15 kc., depending upon the fidelity of the studio equipment used for modulating the system. The restored suppressed-carrier signal indicated by the dotted line 117 is at 38 kc. and is the second harmonic of the pilot carrier represented at 118 with a frequency of 19 kc. The sidebands of the suppressed subcarrier extend substantially from 23 kc. to 53 kc. as indicated, thereby to provide for substantially the full 15 kc. modulation referred to.

The possible SCA background music channel is indicated by the block 120 and extends 7.5 kc. on either side of a 67 kc. subcarrier signal indicated by the dotted line 121.

When a stereophonic FM signal is being received by the FM receiver, a composite signal as represented in FIGURE 2 is developed across the output terminals of the FM detector 8. Since the response of the stages preceeding the stereo multiplex unit 15 may "roll-off" at high frequencies, that is, provide less gain at high frequencies, the overall receiver frequency response may be made flat by designing the amplifier stage 23 to provide more gain at the higher frequencies. This is done in the present example by selecting the resistance value of the network 22 and the capacitance of the capacitor 30 to provide low frequency degeneration or high frequency boost in proportion to the amount of high frequency roll-off in the preceding stages.

The resultant signal is linearly amplified in the stage 18, with the 19 kc. pilot signal being developed in the tuned anode 36 circuit, and the composite signal in the cathode 19 circuit.

The full wave rectifier-frequency doubling circuit 39 receives the 19 kc. pilot signal energy from the tuned anode 36 circuit. On the half cycle where the top terminal of the winding 40 is positive, the diode 43 is cut-off and the diode 42 conducts current which flows through the resistors 44 and 45 back to the center tap of the winding 40. On opposite half cycles the diode 42 is cut-off and the diode 43 conducts through the same path. Since resistor 44 is small relative to the resistor 45, the capacitor 46 charges up to positive voltage almost equal to the peak voltage of the signals across each half of the winding 40. Since the resistor 44 is not bypassed by the capacitor 46, a pronounced voltage pulse is produced thereacross at a 38 kc. rate, or two pulses for each cycle of the 19 kc. pilot tone. The discharge time constant for the resistor 45, capacitor 46 network is adjusted to control the conduction angle of the diodes 42, 43. In practice, excellent operational characteristics were observed when each diode conducted for about 30° per cycle of 19 kc. pilot signal energy.

During monophonic reception, the oscillator does not operate because of the positive voltage applied to the cathode thereof, and noise at 19 kc. does not tend to turn the oscillator on because of the time-constant of the resistor 44, capacitor 46 network. When the positive voltage from the full wave rectifier frequency doubler circuit 39 exceeds at grid 49 the threshold voltage at the cathode 54 set by the voltage divider 55–56, the circuit oscillates and is locked in frequency and phase to the 38 kc. pulses applied to the grid 49. It will be noted that the capacitor 98 provides a low impedance path for the 38 kc. synchronizing pulses, and the resistor 97 provides isolation between the negative voltage which tends to build up at the grid when the oscillator begins oscillating, and the positive voltage which develops across the resistors 44 and 45.

The 38 kc. voltage appearing at the anode 50 is applied to a neon lamp 33, which lights up to provide an indication that stereophonic signals are being received.

The fact that the oscillator output voltage is necessary for the detection of the subcarrier sidebands, and this output voltage is produced only when a stereophonic signal is received, provides an automatic stereophonic-monophonic control for the receiver.

The 38 kc. oscillator output voltage and the subcarrier sidebands are applied to the balanced synchronous switch detector 57 to derive the original L–R signal information. One of the problems encountered in previous FM multiplex subcarrier detectors for stereophonic signal transmission is that of severe intermodulation distortion. It has been found that one of the primary causes of this distortion is the intermodulation between the pilot signal (19 kc.) and the regenerated subcarrier (38 kc.), with signal information which is nearly subharmonic to the 38 kc. subcarrier frequency. For example (L+R) signals at 9.5, 6⅓ kc., 12⅔ or detected (L–R) signals at these frequencies react with the 19 kc. pilot signal or 38 kc. subcarrier in the subcarrier detector to produce the undesired intermodulation distortion.

The intermodulation of pilot signal residue and reinserted stereophonic subcarrier with their subharmonics can occur in the nonlinear detection mechanism of an FM stereo demodulator. The audio-frequency beat caused by this intermodulation is particularly objectionable since it is usually not harmonically related to the information involved in its generation and is thus distinguishable from "natural" intermodulation effects resulting from the nonlinear translation of the actual program material. The presence of the 38 kc. in the detection process at a nearly constant level is assured; so that unrelated notes resulting from intermodulation distortion in prior circuits can be sustained for noticeable periods on some program material, thereby producing objectional effects in the sound output.

Prior stereophonic subcarrier demodulators have attempted to separate the subcarrier sidebands (38 kc.±15 kc.) from the other information with filters approximating a flat frequency passband characteristic from 23 kc. to 53 kc. However, the approximation to flatness has been poor since the cut-off characteristics of signals outside the 23 kc.–53 kc. band is not steep unless the filter is made complicated and expensive. Thus many of these prior filters permit some of the 19 kc. pilot signal and some of the (L+R) signal corresponding to subharmonics of 19 kc. to reach the subcarrier detector, which not only reduces the stereophonic signal separation but these signals contain components which produce the undesirable intermodulation distortion. Furthermore, those components of the subcarrier sidebands which when detected correspond to the troublesome subharmonics, are applied without attenuation to the subcarrier detector.

The intermodulation distortion problem is greatly reduced in the present circuit by the provision of predetection de-emphasis. In the present case the de-emphasis is effected in connection with the filter circuit 66 which separates the subcarrier sidebands from the remainder of the signal. The inductor 68 of the filter 66 resonates with the effective capacity of the circuit 69–70 at 38 kc. The series inductor 69–capacitor 70 resonate at 67 kc. to provide better SCA channel rejection than could be obtained with a simple parallel resonant circuit. In addition, the series resonant circuit tends to make the overall filter 66 response symmetrical on an arithmetic scale rather than a logarithmic scale which is the case with a simple parallel resonant circuit. The filter 66, in combination with the resistor attenuates the subcarrier sidebands in such a manner that the resulting (L–R) audio frequency signal high frequency information is de-emphasized at a rate of 75 microseconds. The response of this network is shown in FIGURE 3. The exact proportions of the elements depend upon how much the preceding stages have attenuated the high frequency signal components, that is, on how much high frequency roll-off occurs in the preceding tuner. In the present case the tuner roll-off is compensated by a complementary amount of high frequency gain in the amplifier stage 23.

It can be seen from the graph of FIGURE 3 that the filter-de-emphasis network attenuates the 67 kc. SCA subcarrier signal 57 db, the 19 kc. pilot signal 21 db, and the main channel audio components in excess of 25 db. Since the 19 kc. pilot signal and the subharmonic components thereof in the L+R channel are greatly attenuated, the amount of intermodulation between these components is also attenuated. In like manner, the subcarrier sideband frequencies which when detected produce audio frequencies subharmonically related to the pilot signal (such as 38 kc.±9.5 kc.) are attenuated to also reduce the intermodulation distortion. In this regard it should be noted that the intermodulation output is a product function of the intermodulating signals.

The predetection de-emphasis provides another advantage in that any intermodulation distortion which is produced in the subcarrier detector is not emphasized. To illustrate, in prior multiplex units audio signals at about 6 kc. could interact with the 19 kc. pilot signal to produce about a 1 kc. intermodulation product. (The third harmonic of 6 kc. intermodulating with 19 kc.) Following detection, the signal was passed through a de-emphasis network where the 6 kc. signal from which the intermodulation product originated is attenuated relative to the resultant 1 kc. signal. This process has the effect of emphasizing the intermodulation product relative to the rest of the signal.

However, where predetection de-emphasis is used, any intermodulation output from the detector is not emphasized in the manner described above, thereby providing an effective reduction in such distortion so far as the listener is concerned.

Another feature which tends to reduce the amount of intermodulation distortion in the circuit of FIGURE 1 is the use of the full wave-rectifier frequency doubler connected in a balanced circuit configuration. With the balanced circuit, the 19 kc. pilot tone is not fed to the oscillator along with the 38 kc. component. As a result, the danger of the 19 kc. pilot signal reaching the subcarrier detector through the oscillator channel is materially reduced.

Since the de-emphasis process is effected prior to detection rather than subsequent thereto in the multiplex unit 15, it is desirable to use a detector which does not have high frequency components corresponding to the pilot signal, subcarrier, subcarrier sidebands or the like in its output. The reason for this is that the high frequency energy may cause distortion in succeeding amplifier stages by driving these amplifiers sufficiently away from the center of the linear portion of their dynamic range, that the desired audio signals drive these amplifiers into nonlinear regions. In addition, the undesired high frequency energy may cause other undesirable effects such as heating of the loudspeaker voice coils.

The balanced synchronous peak detector 57 provides a high ratio of desired audio to spurious frequency output with no additional filtering requirements. To understand the operation of the detector 57 ignore for the moment the subcarrier sideband connections and assume that the center tap of the winding 58 is grounded, and that only the 38 kc. oscillator voltage is applied to the diodes 59 and 60. Assuming no diode losses, the cathode voltage of diode 59 will after several cycles of input voltage, reach a positive D.-C. level which corresponds to the peak value of the applied oscillator voltage since the time constant of the resistor 61-capacitor 62 is long compared to the period of the 38 kc. input source. Under these conditions, the diode 59 current flows for a very few degrees of each cycle, or in other words the diode represents an open circuit except for the brief time of conduction. The conduction angle can be controlled by selection of the amplitude of the oscillator voltage and the values of the resistor 61-capacitor 62 network. The diode 60 operates in exactly the same manner and conducts during the same portion of the input cycle, except that the D.-C. voltage delivered to the resistor 64-capacitor 65 is negative but equal to the positive voltage developed across the resistor 61-capacitor 62 network.

Since there are equal and opposite voltages at the remote ends of the resistors 61 and 64, and these resistors are of equal value, there is no current flow from, or to the junction of these resistors so there is none at the hypothetically grounded center tap of the winding 58. If a D.-C. voltage is applied between the center tap of the winding 58 and ground, the capacitor 63 will be charged to that level each time one of the diodes conducts, and since there is no discharge path (except through the diodes) this potential will be maintained across the capacitor 63.

The circuit operates in the same manner when the subcarrier sidebands are applied between the center tap of the winding 58 and ground. With reference to FIGURE *4a*, the waveform E represents a double sideband suppressed carrier signal which is applied to the center tap of the winding 58. If the oscillator switching voltage, which is large relative to that of the sideband signals, is phased so that the diodes conduct at the times indicated by the dots, the output voltage across the capacitor 63 will be that shown in FIGURE *4b*, which is a step approximation of the original modulating wave. It should be noted that the negative portions of the modulating voltage cause the subcarrier sidebands to reverse in phase by 180° with respect to the positive portions of the modulating wave. The resultant step approximation wave form has very little harmonic distortion and the amplitude of the spurious (higher frequency) output components is much less than that of the desired signal; becoming zero when the subcarrier sideband voltage goes to zero. In other words, the detector is balanced with respect to the 38 kc. oscillator switching voltage, so that none of this voltage is applied to the phase splitter 74, and the conduction angle of the diodes 59 and 60 is small enough substantially to prevent the unbalanced subcarrier sidebands and other high frequency components from being applied to the phase splitter.

The subcarrier demodulation and matrixing circuit described is simple and economical to build and adjust as compared to contemporary circuits for accomplishing the same function. The circuit includes a simple and highly efficient subcarrier sideband detector, which provides an audio signal output with very little distortion, and at the same time balances out or blocks higher frequency components corresponding to the 38 kc. oscillator switching voltage, the subcarrier sidebands and the like.

The circuit described also exhibits a very low intermodulation distortion characteristic and does not produce an emphasized intermodulation product as a result of the predetection pre-emphasis of the subcarrier sidebands and the use of a very linear detection. The use of the balanced synchronous peak detector in combination with the predetection de-emphasis permits economy in the circuit design in that additional filters are not required in the L and R output channels to remove the high frequency components. Although the predetection de-emphasis and synchronous peak detector are described, conventional post-detection de-emphasis and other types of subcarrier detectors could be used.

In addition to the foregoing advantages the circuit also provides automatic stereophonic-monaural reception control and indication, in that the oscillator does not operate unless a stereophonic signal is received. In combination with the balanced synchronous peak detector, the normally inoperative controlled oscillator circuit provides improved noise immunity during monophonic reception since there is no oscillator switching voltage present to detect SCA or other high frequency signals which may be applied to the detector.

In the description of FIGURES 5–8, circuit elements which correspond to like elements of FIGURE 1 will be identified by the same reference numeral as used in FIGURE 1.

Although full wave rectification is used in the circuit of FIGURE 1 for the purpose of doubling the 19 kc. pilot signal, a single diode (half-wave rectification) may be used with an oscillator tuned either to the frequency of the 19 kc. synchronizing signal or to a multiple thereof. The circuit of FIGURE 5 illustrates this feature, possibility only so much of the circuit being illustrated as is different from the circuit of FIGURE 1. A 19 kc. pilot signal is developed across the winding 37. A winding 110 coupled to the winding 37 applies the 19 kc. signal to a diode 112 which is connected to operate as a half wave rectifier. When a 19 kc. signal is received, and applied to the diode 112, current will flow through the resistors 44 and 45 to charge up the capacitor 46 to some positive voltage sufficient to overcome the reverse bias applied to the cathode 54 of the oscillator tube. In addition to the positive D.-C. bias developed across the capacitor 46, there is a 19 kc. component which controls the phase and frequency of the oscillator. The oscillator tank circuit including the inductor 51 and capacitors 52 and 53 is tuned to 38 kc. or the second harmonic of the pilot signal to produce the necessary switching signal to be applied to the subcarrier detector. For certain types of subcarrier detector circuit configurations it may be desirable to tune the oscillator tank circuit to 19 kc. If desired an indicator circuit including a neon lamp may be connected across the oscillator tank circuit as described in connection with FIGURE 1. The operation of the circuit of FIGURE 5 is similar to that of FIGURE 1 in that the oscillator is inoperative except during the reception of stereophonic signals including the 19 kc. pilot tone. The pilot tone in addition to providing the necessary synchronizing signal is rectified to provide the "turn-on" bias for the oscillator. In this manner automatic stereophonic-monophonic control of the unit is effected.

Another method of controlling the oscillator 48 is shown in FIGURE 6. In this circuit the oscillator tube 48 on-off bias is controlled by a second tube 122 whose cathode is connected in common with the cathode 54 of the tube 48 and to ground through a common resistor 123. The advantage of the circuit shown in FIGURE 6 is that the direct current component derived from the rectification of the pilot signal is limited by the tube 122 so that a more stable phase lock of the oscillator 48 with the pilot signal is effected with variations in the pilot signal amplitude.

In the absence of a pilot signal, the tube 122 acts as a cathode follower and its cathode current flowing through the resistor 123 maintains the oscillator 48 cut off. A small positive voltage applied from the terminal 124 through a resistor 125 to the control grid 126 of the tube 122 determines how far into cut off the oscillator tube 48 is maintained. When a pilot signal is received, and applied to the full wave rectifier circuit, a negative D.-C. voltage is developed across the capacitor 127 (connected in parallel with resistor 125) which D.-C. voltage is sufficient to drive the tube 122 into cut off. This removes the bias from the oscillator tube 48, turning it on to produce a 38 kc. switching voltage for application to the subcarrier detector. No matter how large the amplitude of the pilot signal becomes beyond the cut off point of the tube 122, no further change in the operating bias of the oscillator tube 48 occurs. The positive synchronizing pulses at the 38 kc. rate are developed across a resistor 128 and applied to the grid of the oscillator through a capacitor 129 to provide the phase lock information. The capacitor 129 also serves as a storage capacitor for the negative charge built up by the oscillator grid current flow. When the 19 kc. pilot signal is no longer present, the tube 122 goes into conduction and biases the oscillator 48 to an inoperative condition. The circuit of FIGURE 6 may be otherwise similar to that of FIGURE 1.

In the multiplex demodulator, the use of an oscillator which operates only when the 19 kc. pilot signal is present makes it possible to provide automatic switching between stereophonic and monophonic operation of not only the detector circuit as described above in connection with FIGURE 1, but can be used to cut off or otherwise inactivate amplifier stages in the audio frequency channel following the subcarrier detector. For example, referring to FIGURE 7, the 19 kc. pilot signal is used to activate and phase lock the oscillator 47 as described above. The ocsillator provides the switching signal for the subcarrier detector 57 which receives the subcarrier sidebands through the coupling capacitor 71. The subcarrier sidebands are demodulated to provide the L—R signal information across the capacitor 63 connected in the grid circuit of the phase-splitter tube 74. Opposite phases of the L—R signal are derived from the anode 75 and cathode 76 of the phase-splitter tube, and are fed to the matrix network.

In the embodiment of the invention shown in FIGURE 7 the phase-splitter tube 74 is normally cut-off by a voltage from a voltage divider network including the resistor 78 and a resistor 130 connected between ground and the source of operating potential +B. In the absence of stereophonic signal information including the 19 kc. pilot signal, the phase-splitter tube 74 is cut off so that no noise or other spurious signal can get through to the matrix network to degrade the (L+R) or monophonic performance of system.

When a 19 kc. pilot signal is received, the oscillator 47 is activated, and a portion of the oscillator voltage is applied through a capacitor 132 to a rectifier circuit including a rectifier 134 and a load resistor 136. Rectification of the oscillator signal produces a positive voltage across the resistor 136 with respect to ground. This voltage is applied through a resistor 138 to the center tap of the winding 58 in the subcarrier detector circuit 57, and hence to the control grid 73 of the phase-splitter tube 74. The circuit is designed so that the positive voltage at the grid 73 is sufficient to overcome the positive cathode 76 voltage and bias the phase-splitter tube 74 at its normal operating point. In this way the L—R stereophonic subcarrier channel is automatically activated by the oscillator for stereophonic operation, and automatically muted for monophonic broadcast.

Another way of automatically muting the phase-splitter 74 is shown in FIGURE 8. The circuit of FIGURE 8 is essentially the same as that shown in FIGURE 1 except 74 is shown in FIGURE 8. The circuit of FIGURE 8 is unbalanced rather than balanced as the peak detector 57 shown at FIGURE 1. In the embodiment of the invention of FIGURE 8, the center tap of the winding 58 is returned to ground through the subcarrier sideband filter 66. As described above, the oscillator is inactive except during stereophonic signal reception. And, the phase splitter 74 is also cut-off except when stereophonic signal reception by the positive voltage applied to its cathode 76 by the voltage divider resistors 78 and 130.

The resistance-capacitance networks for the diodes 59 and 60 are unbalanced for direct current but balanced for alternating current. For example the resistor 140 and capacitor 142 connected to the diode 59 are 10,000 ohms and .05 microfarad respectively, and the resistor 144 and capacitor 146 are 50,000 ohms and .01 microfarad respectively. It will be noted that the time constants of the two networks are the same, and so the circuit is balanced with respect to the resultant audio frequency information developed across the capacitor 63 and applied to the control grid 73 of the phase splitter tube 74.

However, during stereophonic signal reception, when the oscillator 47 is activated, the rectified oscillator voltage appearing at the junction of the resistors 140 and 144 is positive and at a value determined by the rates of the resistors 140 and 144 to bias the phase splitter 74 for proper operation. Thus, the phase splitter is operative to pass audio frequency (L—R) signals only when the oscillator 47 delivers a switching voltage to the subcarrier detector 57. Since the oscillator operates only when a stereophonic FM signal is received, the phase splitter is also operative only during stereophonic FM signal reception.

It will be understood that the component values indicated in the various figures of the drawing are given only by way of example to illustrate operative embodiments of the invention, and that it is possible to build other circuits using different circuit configurations and component values without departing from the scope of the invention.

What is claimed is:

1. A subcarrier detector for frequency modulation stereophonic receivers comprising:

an input circuit for connection to a source of subcarrier sideband signals and a pilot signal whose frequency is half that of said subcarrier, means coupled to said input circuit for selecting said pilot signal, full wave rectifier circuit means coupled to said selecting means for producing, in response to the presence of said pilot signal, a control signal having a direct current component and a ripple component related in phase to and at twice the frequency of said pilot signal, normally inactivated oscillator circuit means, including direct current biasing means arranged to maintain said oscillator circuit means inactive in the absence of said control signal, for developing a voltage at a frequency twice that of said pilot signal, means for applying said control signal to said oscillator circuit means to overcome the effect of said biasing means and thereby activate and synchronize said oscillator means in relation to said pilot signal, and a subcarrier detector coupled to receive said subcarrier sideband signals and said oscillator voltage for demodulating said subcarrier wave.

2. A subcarrier detector for frequency modulation stereophonic receivers comprising:

an input circuit for coupling to a source of subcarrier sideband signals and a pilot signal whose frequency is half that of said subcarrier, means coupled to said input circuit for selecting said pilot signal, a half wave rectifier circuit coupled to said selecting means to provide a direct current output voltage with a ripple component at the frequency of said pilot signal, means providing a normally inactivated oscillator circuit for developing a voltage at a frequency related to the frequency of said ripple component, means for applying said direct current output voltage to said oscillator circuit to activate and synchronize said oscillator at a frequency related to that of said ripple component, and a detector coupled to receive said subcarrier sideband signals and said oscillator voltage for demodulating said subcarrier wave.

3. A subcarrier detector as defined in claim 2 wherein said oscillator is synchronized at a frequency twice that of said ripple component.

4. A subcarrier detector as defined in claim 3 wherein said oscillator is synchronized at a frequency equal to that of said ripple component.

5. A subcarrier detector for frequency modulation stereophonic receivers comprising:

an input circuit for connection to a source of demodulated frequency modulation signals which during monophonic reception comprises audio frequency signals and spurious signal components at superaudible frequencies, and which during stereophonic reception includes (1) audio frequency signals, (2) subcarrier sideband signals and (3) a pilot signal;

an oscillator circuit, means for biasing said oscillator circuit to an inactive condition during monophonic signal reception, means for separating said pilot signal from the remainder of said composite signal, means for rectifying said pilot signal to derive a D.-C. voltage, means responsive to said D.-C. voltage for overcoming said biasing voltage on said oscillator to render said oscillator operative and synchronized to a frequency related to that of said pilot signal, a subcarrier detector circuit coupled to said oscillator circuit and having output terminals across which audio frequency signal information is produced only when said oscillator is oscillating, and a filter connected between said input circuit and said subcarrier detector for applying said subcarrier sideband signals to said subcarrier detector circuit.

6. A subcarrier detector for frequency modulation receivers comprising:

means providing a normally inactive oscillator circuit for developing a voltage at a frequency related to the frequency of a subcarrier to be received, means responsive to a received subcarrier wave for deriving a synchronizing signal and sidebands corresponding to said subcarrier wave, means for applying said synchronizing signal to said oscillator to activate and synchronize said oscillator, a subcarrier detector coupled to receive said subcarrier wave sidebands and said oscillator voltage for deriving audio frequency modulating information from said subcarrier wave, a normally inactive audio amplifier coupled to said subcarrier detector for translating said audio frequency information, and means responsive to said oscillator voltage for activating said audio amplifier to translate said audio frequency information.

7. A subcarrier detector for frequency modulation stereophonic receivers comprising:

an input circuit for connection to a source of demodulated frequency modulation signals which during monophonic reception comprises audio frequency signals and spurious signal components at superaudible frequencies, and which during stereophonic reception includes (1) audio frequency signals, (2) subcarrier sideband signals and (3) a pilot signal;

an oscillator circuit including a control device for biasing said oscillator circuit toward cut off so as to be inoperable to produce oscillatory signals when said control device is conductive and to bias said oscillator circuit to produce oscillation when said control device in nonconductive, means for separating said pilot signal from the remainder of said composite signal, means for rectifying said pilot signal to derive a D.-C. voltage, means for applying said D.-C. voltage to said control device to render said control device nonconductive and cause said oscillator to become operative to produce oscillations at the frequency of said pilot signal, and a subcarrier detector circuit coupled to said oscillator circuit and said input circuit for receiving a signal from said oscillator and said subcarrier sideband signals.

8. A subcarrier detector for frequency modulation stereophonic receivers comprising:

an input circuit for connection to a source of demodulated frequency modulation signals which during monophonic reception comprises audio frequency signals and spurious signal components at superaudible frequencies, and which during stereophonic reception includes (1) audio frequency signals, (2) subcarrier sideband signals and (3) a pilot signal, an oscillator circuit including a first tube having an anode, cathode and control grid, a control circuit including a second tube having an anode, a cathode and a control grid, an impedance element connected between the cathodes of said first and second tubes and a point of reference potential, the parameters of said oscillator and control tube circuits being such that said oscillator tube is substantially cut off when said control tube is conducting and vice-versa, means for separating said pilot signal from the remainder of said composite signal, a full wave rectifier circuit for rectifying said pilot signal to derive a direct voltage with a ripple component at twice the frequency of said pilot signal, means for applying said direct voltage to said control tube to cut-off said control tube and thereby render said oscillator operative, means coupling said ripple component to said oscillator to synchronize the oscillator output frequency to twice the frequency of said pilot signal, and a subcarrier detector circuit coupled to said oscillator circuit and to said input circuit for receiving said subcarrier sideband signals.

9. A subcarrier detector for frequency modulation stereophonic receivers comprising:

an input circuit for coupling to a source of demodulated frequency modulation signals which during monophonic reception comprises audio frequency signals and spurious signal components at superaudible frequencies, and which during stereophonic reception includes (1) audio frequency signals, (2) subcarrier sideband signals and (3) a pilot signal;

a normally non-oscillating oscillator circuit, means responsive to said pilot signal for activating said oscillator circuit and synchronizing the phase and frequency of said oscillator circuit, a subcarrier detector circuit coupled to said oscillator circuit and to said input circuit for receiving said subcarrier sideband signals, said subcarrier detector circuit being operative to demodulate said subcarrier sidebands to derive audio frequency signals therefrom, an audio amplifier coupled to said subcarrier detector, means for biasing said audio amplifier to block the translation of audio frequency signals therethrough, a rectifier circuit coupled to said oscillator circuit and to said audio amplifier to derive a control voltage when said oscillator circuit is oscillating and apply said control voltage to said audio amplifier to change the bias thereon to permit the translation of audio signals.

10. A subcarrier detector for frequency modulation stereophonic receivers comprising: input terminals for connection to a source of subcarrier sideband signals and a pilot signal whose frequency is harmonically related to that of said subcarrier, a normally inactive oscillator circuit including an output circuit, means, including full wave rectifier means and biasing means, coupled between said input terminals and said oscillator circuit and responsive to the presence of said pilot signal for activating said oscillator and to the absence of said pilot signal for deactivating said oscillator circuit, and indicator means responsive to oscillation of said oscillator to provide an indication when a pilot signal is received by said stereophonic frequency modulation receiver.

11. A subcarrier detector for frequency modulation stereophonic receivers comprising:

an input circuit for connection to a source of demodulated frequency modulation signals which during monophonic reception comprises audio frequency signals and spurious signal components at superaudible frequencies, and which during stereophonic reception includes (1) audio frequency signals, (2) subcarrier sideband signals in a range of frequencies extending between 23 and 53 kc. and (3) a 19 kc. pilot signal, an oscillator circuit including an output circuit, control circuit means for said oscillator including a full wave rectifier circuit coupled to said input circuit for rectifying received pilot signals to derive a direct voltage with a ripple component at twice the frequency of said pilot signal, said control circuit means coupled to apply said direct voltage to said oscillator tube to render said oscillator operative when a pilot signal is received, to oscillate at a frequency synchronized by said ripple component, and inoperative in the absence of a pilot signal, an indicator circuit including a lamp coupled to said oscillator output circuit for energization by said oscillator signal, and a subcarrier detector circuit coupled to said oscillator circuit and to said input circuit for receiving said subcarrier sideband signals.

12. A subcarrier detector for frequency modulation receivers comprising:

means providing an oscillator circuit for developing a voltage at a frequency related to the frequency of a subcarrier to be received, means responsive to a received subcarrier wave for deriving a synchronizing signal and sidebands corresponding to said subcarrier wave, control circuit means responsive to said synchronizing signals to prevent said oscillator from oscillating except when a synchronizing signal is present, a subcarrier detector means coupled to receive said subcarrier wave sidebands and said oscillator voltage for demodulating said subcarrier wave and for providing a direct voltage from said oscillator voltage, an audio frequency amplifier, means for biasing said audio amplifier to prevent the translation of audio frequency signals therethrough, and means coupling said audio amplifier to said subcarrier detector to receive said direct voltage therefrom to bias said audio amplifier for efficient signal translation when said oscillator is energized.

13. A subcarrier detector for frequency modulation receivers comprising:

means providing an oscillator circuit for developing a voltage at a frequency related to the frequency of a subcarrier to be received, means responsive to a received subcarrier wave for deriving a synchronizing signal and sidebands corresponding to said subcarrier wave, control circuit means responsive to said synchronizing signal to prevent said oscillator from oscillating except when a synchronizing signal is present, a subcarrier detector means coupled to receive said subcarrier wave sidebands and said oscillator voltage for demodulating said subcarrier wave, said subcarrier detector including an input winding, a pair of rectifier devices and a pair of resistance-capacitance networks, said rectifier devices being connected in series with said network across said winding and poled so that both diodes conduct for the same polarity of oscillation voltage, said pair of resistance-capacitance networks having substantially the same time constants, with different resistance values to provide a direct output voltage from rectification of said oscillator voltage.

14. A subcarrier detector for frequency modulation stereophonic receivers comprising:

input terminals for connection to a source of subcarrier sideband signals and a pilot signal whose frequency is harmonically related to that of said subcarrier, means coupled to said input terminals for selecting said pilot signal, means providing a normally inactivated oscillator circuit for developing an oscillator voltage when activated at a frequency related to the frequency of said pilot signal, means coupled to said selecting means for developing a control signal when said pilot signal is present, said means for developing a control signal including a rectifier circuit and a control tube the conductivity of which is controlled by said rectifier circuit to maintain said oscillator inactive in the absence of a received pilot signal and to activate said oscillator when a pilot signal is received, means for applying said control signal to said oscillator circuit to activate said oscillator, and a detector coupled to receive said subcarrier sideband signals and said oscillator voltage for demodulating said subcarrier wave.

References Cited by the Examiner

UNITED STATES PATENTS

| | | | |
|---|---|---|---|
| 1,839,419 | 1/1932 | Senauke | 325—455 |
| 3,069,505 | 12/1962 | Collins et al. | 179—15 |
| 3,070,662 | 12/1962 | Eilers | 179—15 |
| 3,105,117 | 9/1963 | Frank | 170—15 |
| 3,176,075 | 3/1965 | Bially | 179—15 |

FOREIGN PATENTS

| | | |
|---|---|---|
| 949,423 | 2/1964 | Great Britain. |

OTHER REFERENCES

Brown, British Communications and Electronics; "New Stereophonic Broadcasting System," March 1960, pages 204 and 205.

Merger, Audio, "Product Detector for FM-Stereo," August 1961, pages 23—25 and 102.

Knight et al., IRE Transactions on Broadcast and Television Receivers, "Design Considerations in the Development of High Quality Stereo Multiplex Receivers With Integral Multiplex Circuits and a 'Multiplexer' for Use With Monaural FM Receivers," November 1961, pages 40–44.

DAVID G. REDINBAUGH, *Primary Examiner.*

R. L. GRIFFIN, *Assistant Examiner.*